US012707007B2

(12) United States Patent
Li et al.

(10) Patent No.: US 12,707,007 B2
(45) Date of Patent: Aug. 11, 2026

(54) METHOD FOR DISPLAYING RECOMMENDED VIDEO AND APPARATUS, MEDIUM, AND ELECTRONIC DEVICE

(71) Applicant: BEIJING YOUZHUJU NETWORK TECHNOLOGY CO., LTD., Beijing (CN)

(72) Inventors: Minghong Li, Beijing (CN); Yuchen Wang, Beijing (CN); Zhaoyiding Mai, Beijing (CN); Jian Wu, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 403 days.

(21) Appl. No.: 18/547,995

(22) PCT Filed: Feb. 23, 2022

(86) PCT No.: PCT/CN2022/077448
§ 371 (c)(1),
(2) Date: Aug. 25, 2023

(87) PCT Pub. No.: WO2022/179522
PCT Pub. Date: Sep. 1, 2022

(65) Prior Publication Data

US 2025/0080643 A1 Mar. 6, 2025

(30) Foreign Application Priority Data

Feb. 26, 2021 (CN) ......................... 202110220227.7

(51) Int. Cl.
*H04M 1/72463* (2021.01)
*G06Q 30/0207* (2023.01)

(52) U.S. Cl.
CPC .. *H04M 1/724631* (2022.02); *G06Q 30/0207* (2013.01)

(58) Field of Classification Search
CPC ......... H04M 1/724631; G06Q 30/0207; G06F 16/74; G06F 16/35
See application file for complete search history.

(56) References Cited

U.S. PATENT DOCUMENTS

2009/0157502 A1 6/2009 Cooper et al.
2011/0313653 A1* 12/2011 Lindner ............ G01C 21/3632 701/523

(Continued)

FOREIGN PATENT DOCUMENTS

CN 105869013 A 8/2016
CN 106792075 A 5/2017

(Continued)

OTHER PUBLICATIONS

International Search Report issued Apr. 24, 2022 for PCT Application No. PCT/CN2022/077448, English translation (9 pages).

(Continued)

*Primary Examiner* — Farid Seyedvosoghi

(57) ABSTRACT

The present disclosure relates to a method for displaying a recommended video and an apparatus, a medium, and an electronic device. The method includes: detecting, in a case where a terminal screen is in a locked state, whether there is an unlocking operation of a user for the terminal screen in a process of playing a prompt voice corresponding to the recommended video after current playback of a target audio is completed; playing audio data in the recommended video if the unlocking operation is not detected in the process of playing the prompt voice; and playing the audio data and video image data in the recommended video in a target application in response to the unlocking operation of the user for the terminal screen in a process of playing the audio data.

17 Claims, 3 Drawing Sheets

Detect, in a case where a terminal screen is in a locked state, whether there is an unlocking operation of a user for the terminal screen in a process of playing a prompt voice corresponding to the recommended video — 11

Play audio data in the recommended video if the unlocking operation is not detected in the process of playing the prompt voice — 12

Play the audio data and video image data in the recommended video in a target application in response to the unlocking operation of the user for the terminal screen in a process of playing the audio data — 13

(56) References Cited

U.S. PATENT DOCUMENTS

| | | | | |
|---|---|---|---|---|
| 2013/0332842 | A1* | 12/2013 | Bernhardsson | H04L 67/02 715/738 |
| 2021/0258638 | A1* | 8/2021 | Delaney | H04N 21/4666 |
| 2021/0365980 | A1* | 11/2021 | Hain | G06Q 30/0272 |

FOREIGN PATENT DOCUMENTS

| | | | | | |
|---|---|---|---|---|---|
| CN | 107291416 | A | | 10/2017 | |
| CN | 107770616 | A | | 3/2018 | |
| CN | 108447423 | A | | 8/2018 | |
| CN | 110248236 | A | | 9/2019 | |
| CN | 110266879 | A | | 9/2019 | |
| CN | 110493635 | A | * | 11/2019 | H04N 21/4394 |
| CN | 112883228 | A | | 6/2021 | |
| CN | 114793288 | A | * | 7/2022 | H04N 21/4627 |
| WO | WO-2018054148 | A1 | * | 3/2018 | H04N 21/41 |

OTHER PUBLICATIONS

Decision on Rejection issued Apr. 29, 2023 in CN Appl. No. 202110220227.7, English translation (14 pages).

First Office Action issued Feb. 18, 2023 in CN Appl. No. 202110220227.7, English translation (16 pages).

International Written Opinion issued Apr. 24, 2022 for PCT Application No. PCT/CN2022/077448, English translation (9 pages).

* cited by examiner

METHOD FOR DISPLAYING RECOMMENDED VIDEO AND APPARATUS, MEDIUM, AND ELECTRONIC DEVICE

CROSS-REFERENCE TO RELATED APPLICATIONS

The present application is a U.S. National Stage Application under 35 U.S.C. § 371 of International Patent Application No. PCT/CN2022/077448, filed on Feb. 23, 2022, which claims priority to China Patent Application No. 202110220227.7 filed on Feb. 26, 2021, the disclosure of both of which are incorporated by reference herein in its entirety.

TECHNICAL FIELD

The present disclosure relates to a method for displaying a recommended video, an apparatus, a medium and an electronic device.

BACKGROUND

The demand of a user for the expansion of an application is increasing with the development of a computer technology solution. For example, a novel application is being expanded to comprise a reading scene and a listening scene. In the reading scene, a user can read a novel. The listening scene consisting mainly of an audiobook. A user can turn on the listening scene of the application on a terminal so as to implement the playback of a novel.

SUMMARY

The summary is provided for a concise introduction of the concept of the present application, and the concept will be described in detail in the detailed description below. The summary is not intended to identify a critical feature or an essential feature of the claimed technical solution, nor is it intended to be used to limit the scope of the claimed technical solution.

In a first aspect, the present disclosure provides a method for displaying a recommended video, the method comprising: detecting, in a case where a terminal screen is in a locked state, whether there is an unlocking operation of a user for the terminal screen in a process of playing a prompt voice corresponding to the recommended video after current playback of a target audio is completed; playing audio data in the recommended video if the unlocking operation is not detected in the process of playing the prompt voice; and playing the audio data and video image data in the recommended video in a target application in response to the unlocking operation of the user for the terminal screen in a process of playing the audio data.

In a second aspect, the present disclosure provides an apparatus for displaying a recommended video, the apparatus comprising: a detection module configured to detect, in a case where a terminal screen is in a locked state, whether there is an unlocking operation of a user for the terminal screen in a process of playing a prompt voice corresponding to the recommended video after current playback of a target audio is completed; a first playback module configured to play audio data in the recommended video in a case where the unlocking operation is not detected in the process of playing the prompt voice; and a second playback module configured to play the audio data and video image data in the recommended video in a target application in response to the unlocking operation of the user for the terminal screen in a process of playing the audio data.

In a third aspect, there is provided a computer-readable medium having a computer program stored thereon, wherein the computer program, when executed by a processing device, implements the method described in the first aspect.

In a fourth aspect, there is provided an electronic device, comprising: a storage device having a computer program stored thereon; and a processing device configured to execute the computer program in the storage device to implement the method described in the first aspect.

In a fifth aspect, the present disclosure provides a computer program, comprising: instructions that, when executed by a processor, cause the processor to perform the method provided in the first aspect of the present disclosure.

In a sixth aspect, the present disclosure provides a computer program product comprising instructions that, when executed by a processor, cause the processor to perform the method provided in the first aspect of the present disclosure.

Other features and advantages of the present disclosure will be explained in detail in the subsequent specific embodiments.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale. In the drawings.

DETAILED DESCRIPTION

Exemplary embodiments of the present disclosure will be described in detail below with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of the present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first", "second", etc. mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information interacted between multiple devices in the embodiments of the present disclosure are only used for illustrative purposes, and are not used to limit the scope of these messages or information.

In the related art, a user can choose to play novel audio in the screen locked state. However, the related art lacks a way to interact with the user in this scenario, and the user operation is relatively single.

In view of this, an embodiment of the present disclosure provides a method for displaying a recommended video.

Figure 1:
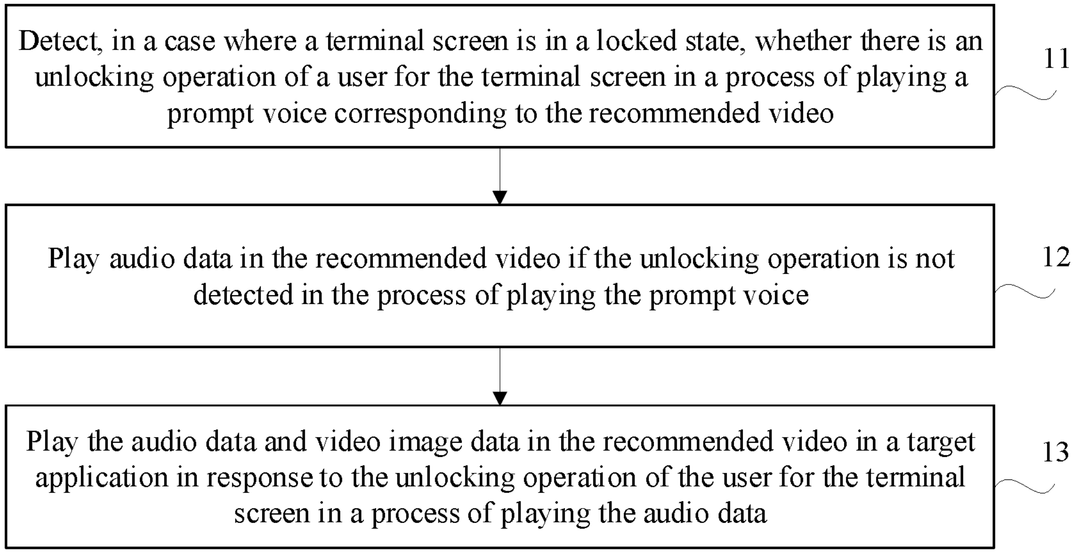
FIG. 1 is a flowchart of a method for displaying a recommended video according to an embodiment of the present disclosure.

FIG. 1 is a flowchart of a method displaying a recommended video according to an embodiment of the present disclosure. As shown in FIG. 1, the method comprise steps 11 to 13.

In step 11, in a case where a terminal screen is in a locked state, whether there is an unlocking operation of a user for the terminal screen is detected in a process of playing a prompt voice corresponding to the recommended video after current playback of a target audio is completed.

Here, the method is applicable to an audio application, such as an audiobook application. The target audio may be a chapter of a book being played in the application, and a recommended video may be played after the audio of the current chapter is finished. The recommended video may be a video for interaction with the user, and the recommended video may be obtained from a preset video library. For example, during the playback of a recommended video, a user can click on the recommended video to perform a switching operation, or the recommended video may be an advertisement video, thereby increasing the diversity of interactions with users and improving the user experience.

In order to improve the user experience and ensure a transition of playback of the recommended video, a prompt voice can be played before the playback of the recommended video, wherein the prompt voice is used to prompt the user that a recommended video will be played next. In an embodiment, the prompt voice is a prompt tone that prompts that the recommended video will be played next. In another possible embodiment, the prompt voice also comprises the name of the recommended video to be played next, etc., that is, it can prompt the user with the content information of the recommended video. When the user is interested in the recommended video, the user can unlock the screen by an unlocking operation for the terminal screen, and then watch the recommended video. The detection of the unlocking operation can be done by detecting whether the user performs a click operation on an unlocking button for the terminal screen, or detecting whether there is an unlocking gesture on the terminal screen, etc. The unlocking operation is a conventional operation in the art, and will not be repeated herein.

In step 12, audio data in the recommended video is played if the unlocking operation is not detected in the process of playing the prompt voice.

If the unlocking operation is not detected in the process of playing the prompt voice, it means that the user has not unlocked the terminal screen. That is, the terminal screen is in a screen-off state. In the situation, audio data in the recommended video can be played directly, so that recommendations can be made to the user in the form of audio to expand the way of interaction under the screen-off state of the terminal screen.

In step 13, the audio data and video image data in the recommended video are played in a target application in response to the unlocking operation of the user for the terminal screen in a process of playing the audio data.

For example, the unlocking operation of the user can also be detected during the playback of the audio data. For example, in a case where the user hears that the audio data played is data of interest to him/her, he/she may perform an unlocking operation. In response to the unlocking operation, the terminal screen can be unlocked, and so that the corresponding display interface can be displayed when a target application is entered.

As an example, the audio data and the video image data of the recommended video are played in the target application, and the recommended video can be played completely from the beginning of the recommended video after the terminal screen is unlocked.

As another example, the playing of the audio data and the video image data in the recommended video in the target application comprises: maintaining playback of the audio data and displaying the video image data corresponding to the audio data played in the recommended video in a target interface of the target application. In the embodiment, in response to the unlocking operation, the playback of the audio data is maintained. Since the audio data is an audio part of the video data, there is no need to switch the audio data for playback, so as to ensure the seamless and continuous playback of the audio data and ensure the smoothness of the audio data heard by the user before and after unlocking the terminal screen. In addition, in response to the unlocking operation, the terminal screen is turned on, and the video image data corresponding to the audio data can be displayed in a target interface of the target application, so as to implement the playback of the recommended video on a lightened screen. The audio data and the video image data are comprised in the recommended video, so that when the video image data is displayed, the video image data to be displayed can be directly determined based on the audio data played. For example, a replay control can also be displayed in the target interface, and the recommended video can be replayed in the target interface in response to' a confirmation operation of the user for the replay control to meet the viewing need of the user.

Figure 2A:
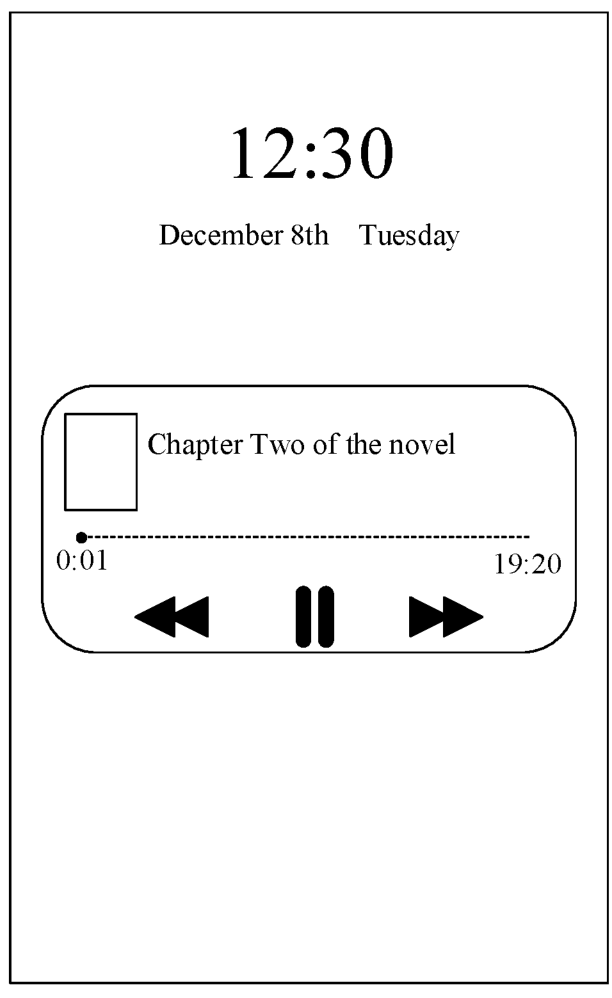
FIG. 2A is a schematic diagram of a locked screen interface according to an embodiment of the present disclosure.
Figure 2B:
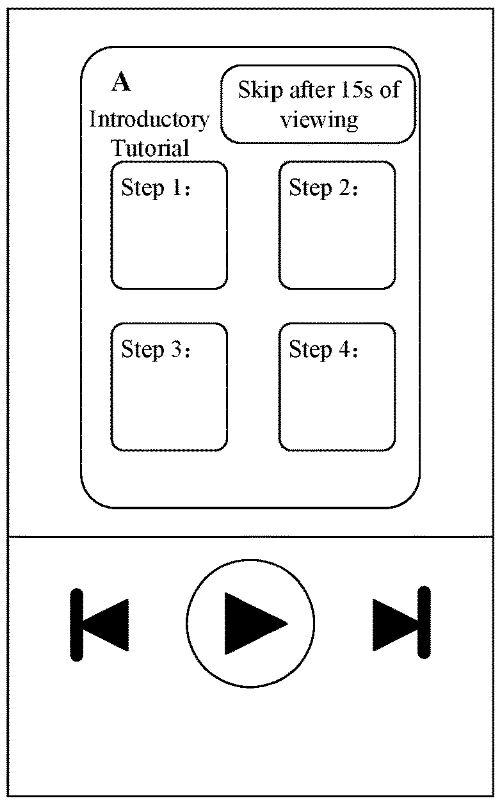
FIGS. 2B and 2C are schematic diagrams of a target interface according to an embodiment of the present disclosure.

In one possible embodiment, the audio data of the recommended video can be played in lock screen state, and when the user wants to watch the recommended video, the user can turn on the screen to watch the video. As an example, The unlocking operation of the user on the terminal screen triggers the lock screen interface under the bright screen of the terminal screen to be displayed as shown in FIG. 2A. After the user performs a sliding operation to unlock the screen and enter a target application, a target interface of the target application is shown in FIG. 2B, wherein an area A in the target interface is used to display the video image data of the recommended video, so that the user can watch the recommended video in the interface.

In the above technical solution, in a case where a terminal screen is in a locked state, whether there is an unlocking operation of a user for the terminal screen is detected in a process of playing a prompt voice corresponding to the recommended video; audio data in the recommended video is played if the unlocking operation is not detected in the process of playing the prompt voice; and in a process of playing the audio data, in response to the unlocking operation of the user for the terminal screen, the playback of the audio data is maintained and the video image data corresponding to the audio data played in the recommended video is displayed in the target interface of the target application. In the above technical solution, in the situation that the terminal screen is locked, the playback of the recommended video is achieved through audio playback, which can not only increase the opportunity to present the recommended video when the terminal screen is locked, but also effectively expand the interaction with the user when the terminal screen is locked. In addition, video images of the recommended video are played back after the terminal screen is unlocked by the user, so that the screen effect of the recommended video can be displayed, providing a better viewing experience for the user, fitting the user's usage needs and further improving the user's usage experience.

In order to make the method for displaying the recommended video in the embodiments of the present disclosure more understandable to those skilled in the art, the following detailed examples are provided.

In one possible embodiment, the method further comprises: playing the audio data in the recommended video in the target application and displaying the video image data corresponding to the audio data played in the recommended video in a target interface of the target application if the terminal screen is in an unlocked state or the unlocking operation is detected in the process of playing the prompt voice.

As an example, when the terminal screen is in the unlocked state, it can be considered that the user is watching screen content, in which case, for example, the recommended video can be played directly after the current playback of the target audio is completed. As another example, after the current playback of the target audio is completed, a prompt voice can be first played, and then the audio data and video image data of the recommended video are directly played after the playback of the prompt voice is completed, so as to implement the playback of the recommended video and directly provide the user with complete video content.

As another example, if the unlocking operation is detected in the process of playing the prompt voice, that is, if the user unlocks the terminal screen in the process of playing the prompt voice, the audio data and the video image data of the recommended video can also be directly played back after the playback of the prompt voice is completed. As another example, after the terminal screen is unlocked by the user, the audio data and the video image data of the recommended video can be played directly in the target application.

Therefore, in the above technical solution, when the terminal screen is turned on, the recommended video can be played directly in the form of a video, so that the complete video content can be presented to the user, thereby facilitating the user's comprehensive understanding of the content in the recommended video, and improving the user's viewing experience.

In one possible embodiment, the method further comprises: determining whether the recommended video is played after the current playback of the target audio is completed.

As an example, whether to play a recommended video is determined in a random manner. For example, a random number can be generated within a preset range, and if the random number is less than a preset value, the recommended video is determined to be played, otherwise the recommended video is determined not to be played. The preset value and the preset range can be set according to the playback frequency of the recommended video in an actual application scenario, such as the higher the playback frequency, the larger the preset value.

As another example, it is possible to specify that the recommended video will be played once a cumulative duration of the playback of the audio in a target application reaches a predefined duration. For example, the preset duration may be set to 100 minutes, and after the current playback of the target audio is completed, if the cumulative duration of the playback of the audio after the last playback of the recommended video is 80 minutes, it can be determined that the recommended video will not be played; or if the cumulative duration of the playback of the audio after the last playback of the recommended video is 110 minutes, it can be determined that the recommended video will be played. It should be noted that the above is for illustrative purposes only and is not intended to limit the disclosure.

The prompt voice corresponding to the recommended video is played to prompt playback of the recommended video in a case where the recommended video is determined to be played.

Therefore, in the above technical solution, it is possible to determine whether to play the recommended video after the playback of a target audio is completed, which on the one hand can effectively avoid the interruption of the playback of the target audio caused by inserting the recommended video during the playback of the target audio, thereby ensuring the smoothness of the audio heard by the user; on the other hand, it can ensure the playback frequency of the recommended video, while avoiding the impact of excessive playback of the recommended video on the user, and thereby ensuring the enthusiasm user's for interactive participation. In addition, in the case where the recommended video is determined to be played, a prompt voice is played first to prompt the user, avoiding abruptness caused by playing the recommended video directly during the playback of the target audio, and thereby further improving the user experience.

In one possible embodiment, the method further comprises: determining whether a skip condition is satisfied in response to a confirmation operation of the user for a skip control in the target interface.

Figure 2C:
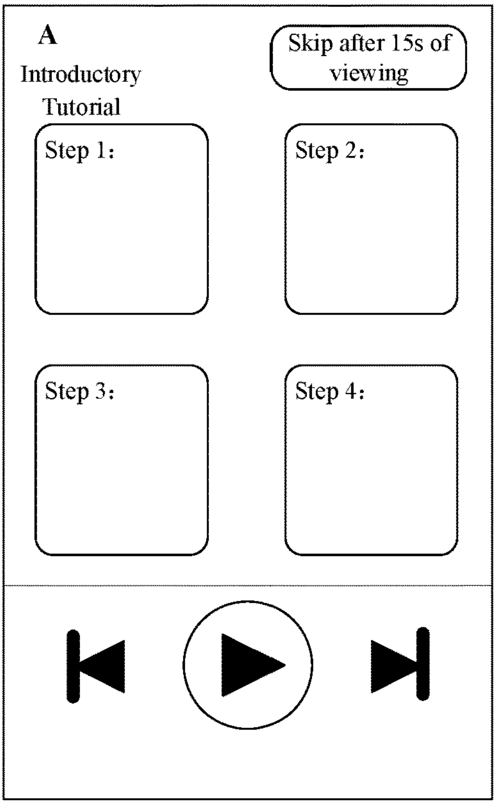

FIG. 2C shows a diagram of a target interface, wherein the control that shows "skip after 15 s of viewing" can be the skip control, which is used to control skipping the current recommended video. For example, control A may contain a skip condition. As shown in FIG. 2C, the skip condition is that a condition satisfied by a duration of the viewed video. A duration "15 s" shown in FIG. 2C may be gradually reduced to 0 over time to reach the skip condition.

As another example, the skip condition may be account level information of the logged-in user. For example, VIP users are allowed to skip the recommended video directly, but ordinary users need to skip after watching, etc.

In a case where it is determined that the skip condition is satisfied, the playback of the recommended video is stopped and a next audio corresponding to the target audio is played.

Continuing the example shown in FIG. 2C, it is determined that the skip condition is satisfied after the viewing time is reduced to 0 s, and then the playback of the recommended video can be stopped. For example, the playback of the audio data and the video image data in the recommended video can both be stopped to implement the function of skipping the recommended video and a next audio corresponding to the target audio is played, thereby achieving continuous playback of the audio heard by the user to satisfy the user's usage requirement.

In the above technical solution, after the user performs an unlocking operation on the terminal screen, user interaction can be achieved through the recommended video. The user can choose to watch the recommended video or skip the recommended video, thereby improving the diversity of user interaction during the display of the recommended video and increasing the user's enthusiasm for use.

In one possible embodiment, the method further comprises: controlling to lock the terminal screen and maintaining playback of the audio data in response to a lock operation of the user for the terminal screen in a case where the video image data is displayed in the target interface; and playing a next audio corresponding to the target audio after the playback of the audio data is completed.

For example, in a case where the terminal screen is in an unlocked state, the user can lock the terminal screen to save power or when the screen display is not needed. In the embodiment, in a case where the video image data is displayed in the target interface, i.e., the terminal screen is in the unlocked state, in response to a lock operation of the user, that is, the user wants to lock the terminal screen and the recommended video is playing at this time, the terminal screen can be controlled to be locked in the state, while maintaining the audio data playing, so as to achieve the effect of displaying the recommended video in an audio manner. It can be understood that in the embodiment, the terminal screen is controlled to be locked, i.e., no display data is provided in the terminal screen, and the display of video image data in the recommended video can be controlled to stop.

In the above technical solution, when the terminal screen is in the unlocked state, and when the recommended video is being played back, if the terminal screen is locked by the user, the audio data in the recommended video can be played continuously when the terminal screen is locked, which on the one hand can satisfy the needs of the user to lock the terminal screen, and on the other hand can ensure that the recommended video can be played continuously, and after the playback of the audio data is completed, a next corresponding to the target audio is played, thereby further improving the diversity of user interaction during the display of the recommended video, and increasing the motivation of the user.

In one possible embodiment, the method further comprises: displaying virtual reward issuance information in the target interface if duration of the video image data displayed in the target interface reaches target duration in a case where the unlocking operation is detected in the process of playing the prompt voice or the audio data.

In the embodiment, in the case where the terminal screen is locked, if an unlocking operation is detected during the playback of the prompt voice or the audio data, it can be considered that the user is unlocking the screen in response to the attentions of the recommended video. In the case, 'the unlocking operation of the user for the terminal screen can increase the efficiency of the recommended video playback while increasing user interaction. Thus, in the embodiment, if an unlocking operation is detected during the playback of the prompt voice or the audio data, a virtual reward can be given to the user in a case where the playback of the recommended video satisfies a certain condition, thereby further improving the user's enthusiasm for participating in the interaction, while improving the convenience of the user's subsequent operations.

As an example, the target duration can be set according to actual usage scenarios. For example, the target duration can be set to 0.5 s, indicating that a virtual reward can be given if a user is interested in watching the recommended video. The target duration can also be set to different levels, with each level corresponding to a different virtual reward. For example, a first level corresponds to a target duration of 0.5 s and a virtual reward R, and a second level corresponds to a target duration of 15 s and a virtual reward 2R. As another example, as described above, the user may trigger the replay of the recommended video by clicking on a replay control. in the embodiment, a corresponding virtual reward may also be set for an interactive operation of the user.

As an example, when duration of the video image data displayed reaches the target duration, virtual reward issuance information can be displayed. For example, the virtual reward issuance information can be displayed through a reward issuance control. Then, a virtual reward corresponding to the virtual reward issuance information is added to account information of the user in response to a confirmation operation of the user for the virtual reward issuance information.

The user can trigger the reward issuance control to generate a confirmation operation by clicking on the virtual reward issuance information in the target interface, so that a corresponding virtual reward can be added to the account information of the user. For example, the virtual reward may be a virtual coin, a listening right, physical book exchange, physical peripheral product exchange, etc., which may be set according to actual usage scenarios, and are not specifically limited in the present disclosure.

In the above technical solution, in response to the interactive operation of the user, a reward can be given to the user for his interactive operation under a certain condition is met, which can motivate the user to pay more attention to the recommended video in the scenario where the terminal screen is locked, thus ensuring the n efficiency and effectiveness of the display of the recommended video and further improving the user experience.

In one possible embodiment, the target interface comprises a recommended video display area, wherein the recommended video display area is configured to display the video image data.

Accordingly, an exemplary method of the displaying of the video image data corresponding to the audio data played in the recommended video in the target interface of the target application comprises: adjusting the video image data according to height information and width information of the recommended video display area, wherein the height information and the width information of the recommended video display area are determined based on height information and width information of an image area in the target interface, the image area being configured to display an image; and displaying the video image data adjusted in the recommended video display area.

As an example, the height information of the recommended video display area is the same as the height information of the image area configured to display an image in the target interface, and the width information of the recommended video display area is the same as the width information of the image area configured to display the image in the target interface. As shown in FIG. 2C, the area A can be the recommended video display area. Compared with the area A shown in FIG. 2B, based on the method of the present disclosure, the recommended video display area can be adaptively expanded based on different terminal displays, so that the recommended video display area can be expanded to a complete display portion of the image area of the terminal for displaying an image, so that the complete integration of the recommended video with the player in the target application can be achieved, which can not only facilitate the user to watch the video, but also achieve the effective and complete playback of the recommended video, thereby improving the display effect and efficiency of the recommended video.

The video image data of different recommended videos may not be the same. In the embodiment, the video image data can be adjusted according to the height information and the width information of the recommended video display area.

As an example, the method of adjusting the video image data may be set in advance. For example, when display information of the video image data is less than display information of the recommended video display area, the adjustment is a stretching operation, and when the display information of the video image data is greater than the display information of the recommended video display area, the adjustment is an intercepting operation, wherein the display information may comprise height information and width information. In this way, the height and the width of the video image data can be directly adjusted to be the same as the height information and the width information of the recommended video display area, so as to implement the adjustment of the video image data.

As another example, the adjustment method of stretching or intercepting can be determined automatically according to the display information of the video image data and its content information, so that the adjusted video image data can maintain display consistency with its original image after adaptation, avoiding the problem of distortion of the display data caused by image adjustment or displaying too little effective content after intercepting, and improving the effectiveness and accuracy of image data adjustment. The adaptive determination of the adjustment method of stretching or intercepting may be determined based on a derived method in the art, which is not repeated in the present disclosure.

In the above technical solution, the recommended video display area can be matched with the image area of the terminal, so as to achieve the complete integration of the display of the video image data and the player in the target application, which may facilitate the user to watch the video. In addition, the video image data can be adaptively adjusted when the video image data is displayed, so that the displayed video image data can be matched with the recommended video display area, thereby achieving the effective and complete playback of the recommended video and improving the display effect and efficiency of the recommended video, thereby further improving the user's viewing experience.

Figure 3:
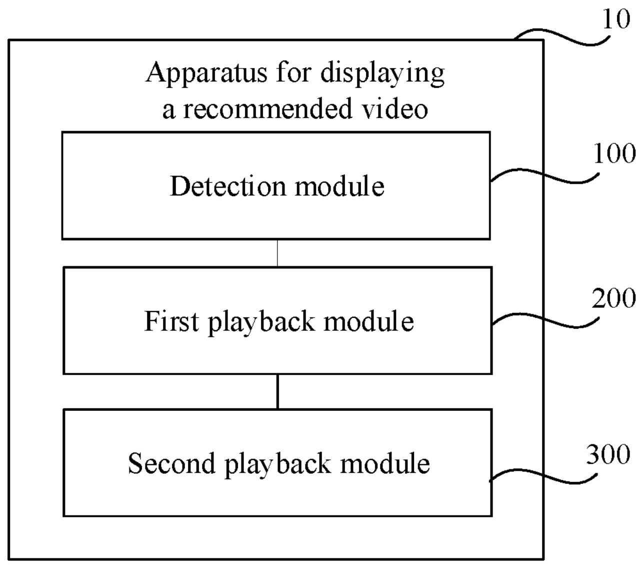
FIG. 3 is a block diagram of an apparatus for displaying a recommended video according to an embodiment of the present disclosure.

The present disclosure also provides an apparatus for displaying a recommended video. As shown in FIG. 3, the apparatus 10 comprises: a detection module 100 configured to detect, in a case where a terminal screen is in a locked state, whether there is an unlocking operation of a user for the terminal screen in a process of playing a prompt voice corresponding to the recommended video after current playback of a target audio is completed; a first playback module 200 configured to play audio data in the recommended video in a case where the unlocking operation is not detected in the process of playing the prompt voice; and a second playback module 300 configured to play the audio data and video image data in the recommended video in a target application in response to the unlocking operation of the user for the terminal screen in a process of playing the audio data.

In some embodiments, the apparatus further comprises: a third playback module configured to, in a case where the terminal screen is in an unlocked state or the unlocking operation is detected in the process of playing the prompt voice, play the audio data in the recommended video in the target application and display the video image data corresponding to the audio data played in the recommended video in a target interface of the target application after the playback of the prompt voice is completed.

In some embodiments, the apparatus further comprises: a first determination module configured to determine whether the recommended video is played after the current playback of the target audio is completed; and a fourth playback module configured to play the prompt voice corresponding to the recommended video to prompt playback of the recommended video in a case where the recommended video is determined to be played.

In some embodiments, the apparatus further comprises: a second determination module configured to determine whether a skip condition is satisfied in response to a confirmation operation of the user for a skip control in the target interface; and a fifth playback module configured to stop playback of the recommended video and play a next audio corresponding to the target audio in a case where it is determined that the skip condition is satisfied.

In some embodiments, the apparatus further comprises: a control module configured to control to lock the terminal screen and maintain playback of the audio data in response to a lock operation of the user for the terminal screen in a case where the video image data is displayed in the target interface; and a sixth playback module configured to play a next audio corresponding to the target audio after the playback of the audio data is completed.

In some embodiments, the second playback module is configured to maintain playback of the audio data and display the video image data corresponding to the audio data played in the recommended video in a target interface of the target application.

In some embodiments, the apparatus further comprises: a display module configured to display virtual reward issuance information in the target interface if duration of the video image data displayed in the target interface reaches target duration in a case where the unlocking operation is detected in the process of playing the prompt voice or the audio data; and an addition module configured to add a virtual reward corresponding to the virtual reward issuance information to account information of the user in response to a confirmation operation of the user for the virtual reward issuance information.

In some embodiments, the target interface comprises a recommended video display area; and the second playback module comprises: an adjustment sub-module configured to adjust the video image data according to height information and width information of the recommended video display area, wherein the height information and the width information of the recommended video display area are determined based on height information and width information of an image area in the target interface, the image area being configured to display an image; and a display sub-module configured to display the video image data adjusted in the recommended video display area.

Figure 4:
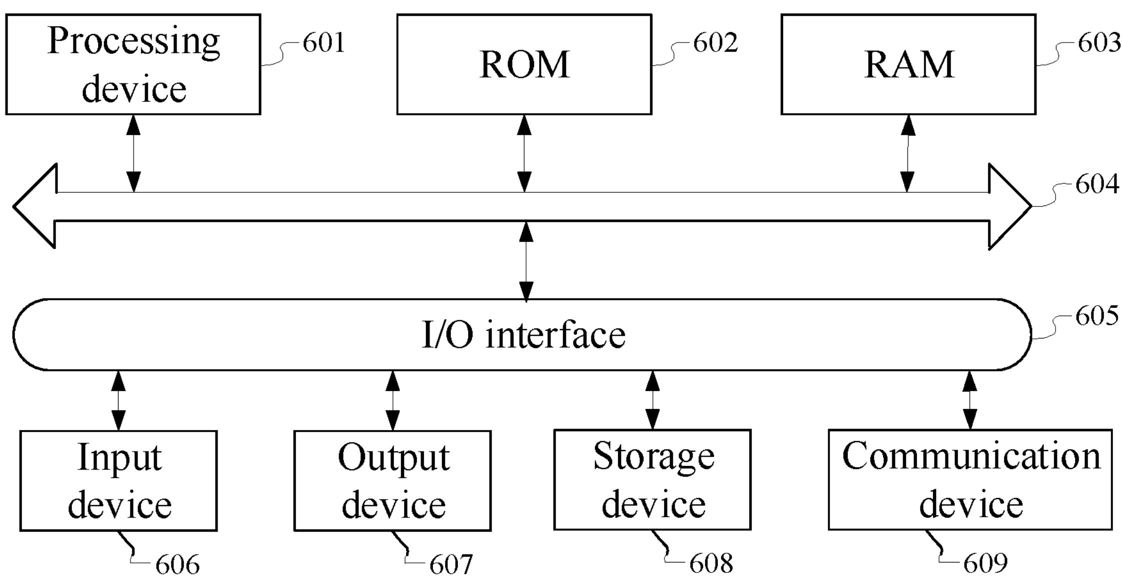
FIG. 4 is a schematic diagram showing a structure of an electronic device suitable for implementing the embodiments of the present disclosure.

Referring now to FIG. 4, FIG. 4 is a schematic diagram showing a structure of an electronic device 600 suitable for implementing the embodiments of the present disclosure. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, or the like. The electronic device shown in FIG. 4 is merely an example and should not impose any limitation on the function and scope of the embodiment of the present disclosure.

As shown in FIG. 4, the electronic device 600 may comprise a processing device (e.g., a central processing unit, a graphics processor, or the like) 601, which may perform various appropriate actions and processes according to a program stored in Read Only Memory (ROM) 602 or a program loaded from storage device 608 into Random Access Memory (RAM) 603. In RAM 603, various programs and data required for the operation of the electronic device 600 are also stored. Processing device 601, ROM 602 and RAM 603 are connected to each other through bus 604. An input/output (I/O) interface 605 is also connected to the bus 604.

Generally, the following devices can be connected to I/O interface 605: an input device 606 comprising, for example, a touch screen, a touch pad, a keyboard, a mouse, a camera, a microphone, an accelerometer, a gyroscope, etc; an output device 607 comprising a liquid crystal display (LCD), a speaker, a vibrator, etc.; a storage device 608 such as a magnetic tape, a hard disk, etc; and a communication device 609. The communication device 609 enables the electronic device 600 to communicate wirelessly or wired with other devices to exchange data. Although FIG. 4 shows the electronic device 600 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 609, or installed from the storage device 608, or from the ROM 602. When the computer program is executed by the processing device 601, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, wherein the program can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN"), a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that cause, when executed by the electronic device, the electronic device to: detect, in a case where a terminal screen is in a locked state, whether there is an unlocking operation of a user for the terminal screen in a process of playing a prompt voice corresponding to the recommended video after current playback of a target audio is completed; play audio data in the recommended video if the unlocking operation is not detected in the process of playing the prompt voice; and play the audio data and video image data in the recommended video in a target application in response to the unlocking operation of the user for the terminal screen in a process of playing the audio data.

The computer program code for executing operations of the present disclosure may be written in one or more program design languages or combinations thereof, the program design languages comprising, but being not limited to, object-oriented program design languages, such as Java, Smalltalk, C++, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the case of the remote computer, the remote computer may be connected to the user computer through various kinds of networks, comprising a local area network (LAN) or a wide area network (WAN), or connected to an external computer (for example, through an Internet provided using an Internet service provider).

The flowcharts and block diagrams in the accompanying drawings illustrate the architecture, functionality, and operation of some possible implementations of systems, methods and computer program products in the different depicted embodiments. In this regard, each block in the flowchart or block diagrams may represent a module, program segment, or portion of code, the module, program segment, or portion of code comprising one or more executable instructions for implementing a specified logical function. It should also be noted that, in some alternative implementations, the functions labeled in the block may occur in a different order than that labeled in the accompanying drawings. For example, two blocks shown in succession may be executed substantially in parallel, or the blocks may sometimes be executed in the reverse order, depending upon the function involved. It will also be noted that each block of the block diagram and/or flowchart, and combinations of blocks in the block diagram and/or flowchart, can be implemented by special purpose hardware-based systems that perform the specified functions or operations, or combinations of special purpose hardware and computer instructions.

The modules involved in the embodiments described in the present disclosure can be implemented in software or hardware. A name of a module does not constitute a limitation of the module itself under a certain circumstance, for example, the detection module may be described as "a module configured to detect, in a case where a terminal screen is in a locked state, whether there is an unlocking operation of a user for the terminal screen in a process of playing a prompt voice corresponding to the recommended video after current playback of a target audio is completed".

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection based on one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, Example 1 provides a method for displaying a recommended video, the method comprising: detecting, in a case where a terminal screen is in a locked state, whether there is an unlocking operation of a user for the terminal screen in a process of playing a prompt voice corresponding to the recommended video after current playback of a target audio is completed; playing audio data in the recommended video if the unlocking operation is not detected in the process of playing the prompt voice; and playing the audio data and video image data in the recommended video in a target application in response to the unlocking operation of the user for the terminal screen in a process of playing the audio data.

According to one or more embodiments of the present disclosure, Example 2 provides the method of Example 1, wherein the method further comprises: playing the audio data in the recommended video in the target application and displaying the video image data corresponding to the audio data played in the recommended video in a target interface of the target application after the playback of the prompt voice is completed if the terminal screen is in an unlocked state or the unlocking operation is detected in the process of playing the prompt voice.

According to one or more embodiments of the present disclosure, Example 3 provides the method of Example 1 or 2, wherein the method further comprises: determining whether the recommended video is played after the current playback of the target audio is completed; and playing the prompt voice corresponding to the recommended video to prompt playback of the recommended video in a case where the recommended video is determined to be played.

According to one or more embodiments of the present disclosure, Example 4 provides the method of Example 1, wherein the method further comprises: determining whether a skip condition is satisfied in response to a confirmation operation of the user for a skip control in the target interface; and stopping playback of the recommended video and playing a next audio corresponding to the target audio in a case where it is determined that the skip condition is satisfied.

According to one or more embodiments of the present disclosure, Example 5 provides the method of Example 1, wherein the method further comprises: controlling to lock the terminal screen and maintaining playback of the audio data in response to a lock operation of the user for the terminal screen in a case where the video image data is displayed in the target interface; and playing a next audio corresponding to the target audio after the playback of the audio data is completed.

According to one or more embodiments of the present disclosure, Example 6 provides the method of Example 1, wherein the playing of the audio data and the video image data in the recommended video in the target application comprises: maintaining playback of the audio data and displaying the video image data corresponding to the audio data played in the recommended video in a target interface of the target application. According to one or more embodiments of the present disclosure, Example 7 provides the method of any one of Examples 1 to 6, wherein the method further comprises: displaying virtual reward issuance information in the target interface if duration of the video image data displayed in the target interface reaches target duration in a case where the unlocking operation is detected in the process of playing the prompt voice or the audio data; and adding a virtual reward corresponding to the virtual reward issuance information to account information of the user in response to a confirmation operation of the user for the virtual reward issuance information.

According to one or more embodiments of the present disclosure, Example 8 provides the method of any one of Examples 1 to 6, wherein the target interface comprises a recommended video display area, and the displaying of the video image data corresponding to the audio data played in the recommended video in the target interface of the target application comprises: adjusting the video image data according to height information and width information of the recommended video display area, wherein the height information and the width information of the recommended video display area are determined based on height information and width information of an image area in the target interface, the image area being configured to display an image; and displaying the video image data adjusted in the recommended video display area.

According to one or more embodiments of the present disclosure, Example 9 provides an apparatus for displaying a recommended video, the apparatus comprising: a detection module configured to detect, in a case where a terminal screen is in a locked state, whether there is an unlocking operation of a user for the terminal screen in a process of playing a prompt voice corresponding to the recommended video after current playback of a target audio is completed; a first playback module configured to play audio data in the recommended video in a case where the unlocking operation is not detected in the process of playing the prompt voice; and a second playback module configured to play the audio data and video image data in the recommended video in a target application in response to the unlocking operation of the user for the terminal screen in a process of playing the audio data.

According to one or more embodiments of the present disclosure, Example 10 provides a computer-readable medium having a computer program stored thereon, wherein the computer program, when executed by a processing device, implements the method described in any one of Examples 1 to 8.

According to one or more embodiments of the present disclosure, Example 11 provides an electronic device, comprising: a storage device having a computer program stored thereon; and a processing device configured to execute the computer program in the storage device to implement the method described in any one of Examples 1 to 8.

According to one or more embodiments of the present disclosure, Example 12 provides a computer program, comprising: instructions that, when executed by a processor, cause the processor to perform the method described in any one of Examples 1 to 8.

According to one or more embodiments of the present disclosure, Example 13 provides a computer program product comprising instructions that, when executed by a processor, cause the processor to perform the method described in any one of Examples 1 to 8.

The above description is only preferred embodiments of the present disclosure and an explanation of the applied technical principles. Those skilled in the art should understand that the scope of disclosure involved in the disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims. For the apparatus described in the above embodiment, the specific ways in which the various modules of the apparatus operate have been described in detail in the embodiments of the relevant method, and will not be explained in detail here.

What is claimed is:

1. A method for displaying a recommended video, comprising:

detecting, in a case where a terminal screen is in a locked state, whether there is an unlocking operation of a user for the terminal screen in a process of playing a prompt voice corresponding to the recommended video after current playback of a target audio is completed;

playing audio data in the recommended video if the unlocking operation is not detected in the process of playing the prompt voice; and playing the audio data and video image data in the recommended video in a target application in response to the unlocking operation of the user for the terminal screen in a process of playing the audio data;

wherein the method further comprises: determining whether the recommended video is played after the current playback of the target audio is completed; and playing the prompt voice corresponding to the recommended video to prompt that the recommended video is about to be played in a case where the recommended video is determined to be played.

2. The method according to claim 1, further comprising:

playing the audio data in the recommended video in the target application and displaying the video image data corresponding to the audio data played in the recommended video in a target interface of the target application if the terminal screen is in an unlocked state or the unlocking operation is detected in the process of playing the prompt voice.

3. The method according to claim 2, further comprising:

controlling to lock the terminal screen and maintaining playback of the audio data in response to a lock operation of the user for the terminal screen in a case where the video image data is displayed in the target interface; and playing a next audio corresponding to the target audio after the playback of the audio data is completed.

4. The method according to claim 2, further comprising:

displaying virtual reward issuance information in the target interface if duration of the video image data displayed in the target interface reaches target duration in a case where the unlocking operation is detected in the process of playing the prompt voice or the audio data; and adding a virtual reward corresponding to the virtual reward issuance information to account information of the user in response to a confirmation operation of the user for the virtual reward issuance information.

5. The method according to claim 2, wherein the target interface comprises a recommended video display area, and the displaying of the video image data corresponding to the audio data played in the recommended video in the target interface of the target application comprises:

adjusting the video image data according to height information and width information of the recommended video display area, wherein the height information and the width information of the recommended video display area are determined based on height information and width information of an image area in the target interface, the image area being configured to display an image; and displaying the video image data adjusted in the recommended video display area.

6. The method according to claim 1, further comprising:

determining whether a skip condition is satisfied in response to a confirmation operation of the user for a skip control in a target interface of the target application; and stopping playback of the recommended video and playing a next audio corresponding to the target audio in a case where it is determined that the skip condition is satisfied.

7. The method according to claim 1, wherein the playing of the audio data and the video image data in the recommended video in the target application comprises:

maintaining playback of the audio data and displaying the video image data corresponding to the audio data played in the recommended video in a target interface of the target application.

8. A non-transitory computer-readable medium having a computer program stored thereon, wherein the computer program, when executed by a processing device, causes the processing device to:

detect, in a case where a terminal screen is in a locked state, whether there is an unlocking operation of a user for the terminal screen in a process of playing a prompt voice corresponding to the recommended video after current playback of a target audio is completed;

play audio data in the recommended video if the unlocking operation is not detected in the process of playing the prompt voice; and play the audio data and video image data in the recommended video in a target application in response to the unlocking operation of the user for the terminal screen in a process of playing the audio data;

wherein the computer program, when executed by the processing device, further causes the processing device to: determine whether the recommended video is played after the current playback of the target audio is completed; and play the prompt voice corresponding to the recommended video to prompt that the recommended video is about to be played in a case where the recommended video is determined to be played.

9. The non-transitory computer-readable medium according to claim 8, wherein the computer program, when executed by the processing device, further causes the processing device to:

play the audio data in the recommended video in the target application and display the video image data corresponding to the audio data played in the recommended video in a target interface of the target application if the terminal screen is in an unlocked state or the unlocking operation is detected in the process of playing the prompt voice.

10. The non-transitory computer-readable medium according to claim 9, wherein the computer program, when executed by the processing device, further causes the processing device to:

control to lock the terminal screen and maintain playback of the audio data in response to a lock operation of the user for the terminal screen in a case where the video image data is displayed in the target interface; and play a next audio corresponding to the target audio after the playback of the audio data is completed.

11. The non-transitory computer-readable medium according to claim 8, wherein the computer program, when executed by the processing device, causes the processing device to:

maintain playback of the audio data and display the video image data corresponding to the audio data played in the recommended video in a target interface of the target application.

12. The non-transitory computer-readable medium according to claim 8, wherein the computer program, when executed by the processing device, further causes the processing device to:

determine whether a skip condition is satisfied in response to a confirmation operation of the user for a skip control in a target interface of the target application; and stop playback of the recommended video and play a next audio corresponding to the target audio in a case where it is determined that the skip condition is satisfied.

13. An electronic device, comprising:

a storage device having a computer program stored thereon; and a processing device configured to execute the computer program in the storage device to:

detect, in a case where a terminal screen is in a locked state, whether there is an unlocking operation of a user for the terminal screen in a process of playing a prompt voice corresponding to the recommended video after current playback of a target audio is completed;

play audio data in the recommended video if the unlocking operation is not detected in the process of playing the prompt voice; and play the audio data and video image data in the recommended video in a target application in response to the unlocking operation of the user for the terminal screen in a process of playing the audio data;

wherein the processing device is further configured to execute the computer program in the storage device to: determine whether the recommended video is played after the current playback of the target audio is completed; and play the prompt voice corresponding to the recommended video to prompt that the recommended video is about to be played in a case where the recommended video is determined to be played.

14. The electronic device according to claim 13, wherein the processing device is further configured to execute the computer program in the storage device to:

play the audio data in the recommended video in the target application and display the video image data corresponding to the audio data played in the recommended video in a target interface of the target application if the terminal screen is in an unlocked state or the unlocking operation is detected in the process of playing the prompt voice.

15. The electronic device according to claim 14, wherein the processing device is further configured to execute the computer program in the storage device to:

control to lock the terminal screen and maintain playback of the audio data in response to a lock operation of the user for the terminal screen in a case where the video image data is displayed in the target interface; and play a next audio corresponding to the target audio after the playback of the audio data is completed.

16. The electronic device according to claim 13, wherein the processing device is further configured to execute the computer program in the storage device to:

determine whether a skip condition is satisfied in response to a confirmation operation of the user for a skip control in a target interface of the target application; and stop playback of the recommended video and play a next audio corresponding to the target audio in a case where it is determined that the skip condition is satisfied.

17. The electronic device according to claim 13, wherein the processing device is further configured to execute the computer program in the storage device to:

maintain playback of the audio data and display the video image data corresponding to the audio data played in the recommended video in a target interface of the target application.

* * * * *